US012586425B2

(12) United States Patent
Skrinska et al.

(10) Patent No.: US 12,586,425 B2
(45) Date of Patent: Mar. 24, 2026

(54) RARE EVENT DETECTION SYSTEM

(71) Applicant: NORTHROP GRUMMAN SYSTEMS CORPORATION, Falls Church, VA (US)

(72) Inventors: James Skrinska, Encinitas, CA (US); Daniel S. Wald, Melbourne, FL (US); Michael Adam Snyder, Provo, UT (US); Dennis Yung Chin Tseng, Chicago, IL (US); Mandeep Singh Mundy, Wildomar, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 131 days.

(21) Appl. No.: 18/516,338

(22) Filed: Nov. 21, 2023

(65) Prior Publication Data

US 2025/0166426 A1 May 22, 2025

(51) Int. Cl.
*G07C 5/02* (2006.01)
*G05B 23/02* (2006.01)

(52) U.S. Cl.
CPC .................................... *G07C 5/02* (2013.01)

(58) Field of Classification Search
CPC ............................ G07C 5/02; G05B 23/0235
USPC ....................................................... 701/32.1
See application file for complete search history.

(56) References Cited

U.S. PATENT DOCUMENTS 7,143,442 B2 11/2006 Scarfe et al.
9,678,811 B2 6/2017 Mutschler
10,402,655 B2 9/2019 Javan Roshtkhari et al.
10,427,655 B2 10/2019 Nix
11,696,682 B2 7/2023 Tran
(Continued)

FOREIGN PATENT DOCUMENTS

EP 3441836 B1 10/2023

OTHER PUBLICATIONS

WOISR (International Notification of Transmittal of The Search Report and The Written Opinion of the International Searching Authority, or Declaration) mailed Mar. 7, 2025 for corresponding PCT/US2024/055967.

*Primary Examiner* — Tyler D Paige
(74) *Attorney, Agent, or Firm* — KATTEN MUCHIN ROSENMAN LLP

(57) ABSTRACT

A rare event detector can calculate a temporal segmentation pattern based on historical time-series data of historical telemetry streams from a first time period. The temporal segmentation pattern includes historical temporal segments. The system can identify sets of predicted events associated with the historical temporal segments based on the historical telemetry streams. The system can calculate dynamic limits for the respective historical temporal segments based on the shapes. The system can identify a set of active temporal segments of an incoming telemetry stream that correspond to a subset of the historical temporal segments. The active temporal segments are from a second time period after the first time period. The system can detect a rare event for an active temporal segment of the set of active temporal segments in response to the incoming telemetry stream exceeding the dynamic limits for a historical temporal segment corresponding to the active temporal segment.

20 Claims, 7 Drawing Sheets

(56) References Cited

U.S. PATENT DOCUMENTS

| | | | | |
|---|---|---|---|---|
| 2003/0073435 | A1* | 4/2003 | Thompson | H04B 7/18513 455/1 |
| 2013/0325997 | A1* | 12/2013 | Higgins | H04L 41/0893 709/208 |
| 2014/0298098 | A1* | 10/2014 | Poghosyan | G06F 11/3452 714/37 |
| 2018/0157255 | A1* | 6/2018 | Halverson | G07C 5/0816 |
| 2019/0226898 | A1* | 7/2019 | Gray, Jr. | H04L 67/12 |
| 2019/0373007 | A1 | 12/2019 | Salunke et al. | |
| 2020/0004903 | A1* | 1/2020 | Gottin | G06F 30/20 |
| 2023/0071496 | A1* | 3/2023 | Park | G05B 23/0235 |
| 2023/0123322 | A1* | 4/2023 | Cella | G06Q 10/067 700/29 |
| 2023/0137432 | A1* | 5/2023 | Selim | G06N 3/08 706/12 |
| 2024/0048470 | A1* | 2/2024 | Ellis | H04B 7/18519 |
| 2025/0166426 | A1* | 5/2025 | Skrinska | G05B 23/0235 |

* cited by examiner

RARE EVENT DETECTION SYSTEM

TECHNICAL FIELD

This description relates to a rare event detection system for time-series telemetry streams.

BACKGROUND

Some vehicles produce telemetry data to represent measurements about a vehicle and/or the vehicle's environment. For example, the telemetry data of a spacecraft may include vehicle measurements, such as the temperatures of parts of the spacecraft, and environmental data, such as images of space from the spacecraft's cameras. Given the complexity of vehicles, the amount of telemetry data received may represent thousands of components of a vehicle and numerous environmental parameters. The amount of telemetry data is increased when received as a telemetry stream that includes the telemetry data as time series data that captures changes to the telemetry data over time. The sheer amount of telemetry data complicates processing and analysis of the telemetry streams, making it difficult for a user charged with the management of the vehicle to readily address issues buried in the telemetry streams.

SUMMARY

A first example relates to a non-transitory machine-readable medium having machine executable instructions for a rare event detector that causes a processor core to execute operations. The operations include calculating a temporal segmentation pattern based on historical time-series data of historical telemetry streams from a first time period. The temporal segmentation pattern includes historical temporal segments. The operations also include identifying sets of predicted events associated with the historical temporal segments based on the historical telemetry streams. The sets of predicted events correspond to shapes of the temporal segmentation pattern for respective historical temporal segments. The operations further include calculating dynamic limits for the respective historical temporal segments based on the shapes of the temporal segmentation pattern. The operations yet further include identifying a set of active temporal segments of an incoming telemetry stream that correspond to a subset of the historical temporal segments of the temporal segmentation pattern. The active temporal segments are from a second time period after the first time period. The operations include detecting a rare event for an active temporal segment of the set of active temporal segments in response to the incoming telemetry stream exceeding the dynamic limits for a historical temporal segment corresponding to the active temporal segment.

A second example relates to a rare event detection system that includes a memory for storing machine-readable instructions and a processor core. The processor core accesses the machine-readable instructions and executes the machine-readable instructions as operations. The operations include calculating a temporal segmentation pattern based on historical time-series data of historical telemetry streams from a first time period. The temporal segmentation pattern includes historical temporal segments. The operations also include identifying sets of predicted events associated with the historical temporal segments based on the historical telemetry streams. The sets of predicted events correspond to shapes of the temporal segmentation pattern for respective historical temporal segments. The operations further include calculating dynamic limits for the respective historical temporal segments based on the shapes of the temporal segmentation pattern. The operations yet further include identifying a set of active temporal segments of an incoming telemetry stream that correspond to a subset of the historical temporal segments of the temporal segmentation pattern. The active temporal segments are from a second time period after the first time period. The operations include detecting a rare event for an active temporal segment of the set of active temporal segments in response to the incoming telemetry stream exceeding the dynamic limits for a historical temporal segment corresponding to the active temporal segment.

A third example relates to a method for detecting rare events. The method includes calculating a temporal segmentation pattern based on historical time-series data of historical telemetry streams from a first time period. The temporal segmentation pattern includes historical temporal segments. The method also includes identifying sets of predicted events associated with the historical temporal segments based on the historical telemetry streams. The sets of predicted events correspond to shapes of the temporal segmentation pattern for respective historical temporal segments. The method further includes calculating dynamic limits for the respective historical temporal segments based on the shapes of the temporal segmentation pattern. The method yet further includes identifying a set of active temporal segments of an incoming telemetry stream that correspond to a subset of the historical temporal segments of the temporal segmentation pattern. The active temporal segments are from a second time period after the first time period. The method includes detecting a rare event for an active temporal segment of the set of active temporal segments in response to the incoming telemetry stream exceeding the dynamic limits for a historical temporal segment corresponding to the active temporal segment.

DETAILED DESCRIPTION

To maintain the health of a deployed device, such as a vehicle, the deployed device may be monitored over time, resulting in tens of thousands of telemetry points of telemetry data streaming to an operator every second. The telemetry data may be processed based on manually defined warning thresholds determined by a mission phase of the vehicle. An operator is tasked with reviewing the massive amount of telemetry data, and so is reliant on the manual warning thresholds to identify problems. The unfortunate result being that the operator is generally unaware of a problem until the warning thresholds are exceeded and an emergency response is needed. Accordingly, the quantity of telemetry data forces the operator to depend on manual warning thresholds even though the default warning thresholds do not provide the operators time to review and act to solve potential problems before the deployed devices risk hardware damage or mission failure.

The systems and methods described herein provide a rare event detection system that identifies dynamic limits for time-series telemetry streams for a deployed device, such as a vehicle to enable early detection of anomalies that are harbingers of errors. The dynamic limits are calculated based on historical time-series data associated with the deployed device. The dynamic limits are calculated to reduce false positives in warning thresholds while enabling augmented awareness of changes in large telemetry sets. The augmented awareness of potential errors offers an opportunity to discover anomalous behavior before an error occurs, which provides the operator time to intervene prior to the occurrence of the error. Additional time to address anomalous behavior may be the difference between success and failure when deployed devices are not directly accessible. For example, a vehicle, such as a satellite, in an inhospitable environment, like space, may not be accessible for hands-on tinkering. Therefore, time is needed to assess anomalies and provide remedial responses that are capable of remotely affecting the vehicle. The rare event detection system described herein provides additional time to address anomalies by detecting rare events sooner based on dynamic limits. The rare event detection system also provides flexibility to operators to adjust the dynamic limits in response to real-time events. The additional time and flexibility allow an operator to address anomalies before the anomalies impact the health of the deployable device, thereby extending mission availability which reduces total lifecycle cost.

Figure 1:
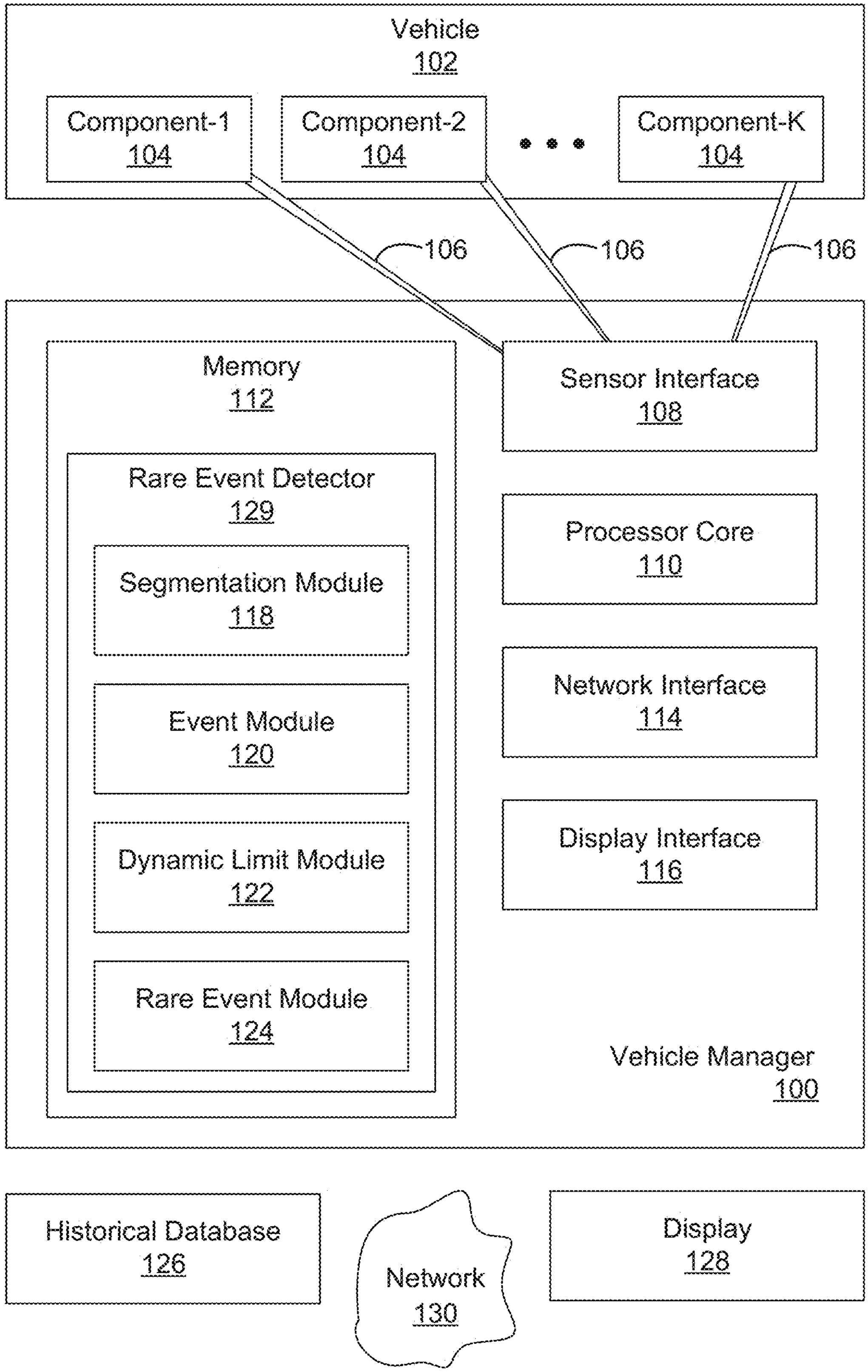
FIG. 1 illustrates an example of an operating environment for a rare event detection system.

FIG. 1 illustrates an example operating environment of a rare event detection system 100 for a deployed device. The rare event detection system 100 may represent application software executing on a computing platform of an operating environment. The deployed devices may be devices of the Internet of Things, robotic devices, and/or vehicles, among others. For clarity, a deployed device will be described with respect to vehicular examples, as a vehicle 102. The vehicle 102 is a moving machine that traverses a physical environment and is powered by any form of energy. The vehicle 102 may be deployed to a physical environment that is inhospitable to humans, such as an underwater environment or space. The vehicle 102 may be a spacecraft, aircraft, watercraft, submarine, car, truck, van, minivan, sport utility vehicle, motorcycle, scooter, amusement ride car, or rail transport. The vehicle 102 may include vehicles that are automated or non-automated with predetermined paths or be free moving.

Figure 2:
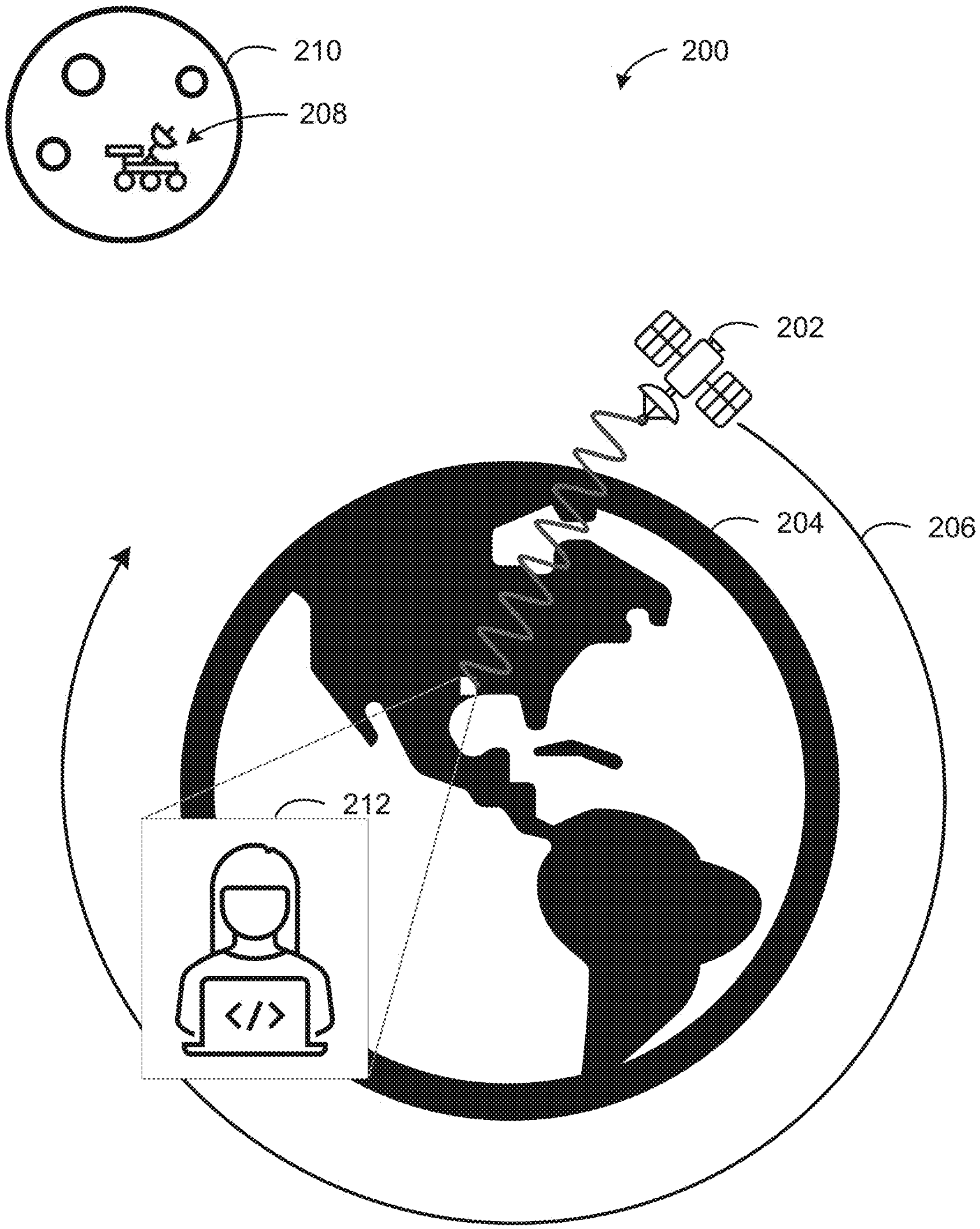
FIG. 2 illustrates an example of a physical environment of a vehicle utilizing the rare event detection system.

Turning to FIG. 2, in one example, the physical environment 200 is extraterrestrial and the vehicle 202 (e.g., the vehicle 102 of FIG. 1) is a satellite. The vehicle 202 may revolve around a celestial body 204 in an orbit 206 of space flight. The physical environment 200 may also include a rover 208 on the moon 210. The vehicle 202 may transmit telemetry streams (e.g., the telemetry streams 106 of FIG. 1) to an operator 212. The telemetry streams include information about the physical environment 200 including the celestial body 204, the orbit 206, the rover, and/or the moon 210 among others. The telemetry streams also include information about the vehicle 202.

Returning to FIG. 1, the vehicle 102 includes a set of components 104, such as sensors, actuators, etc. For example, the components 104 may include position sensors, heading sensors, speed sensors, steering speed sensors, steering angle sensors, throttle angle sensors, accelerometers, magnetometers, gyroscopes, yaw rate sensors, temperature sensors, pressure sensors, global positioning system (GPS) sensors, differential GPS sensors, proximity sensors, cameras, light ranging sensors, etc. The components 104 may also include components that are employable to activate features on the vehicle 102. In various examples, the components 104 include motors, solenoids, pneumatic devices, etc. The components 104 may include modules of vehicle systems such as an electronic stability control system, a collision warning system, a navigation system, a steering system, etc. for controlling operation of the vehicle 102 and/or components 104.

During operation of the vehicle 102, the components 104 generate telemetry streams 106 periodically and/or asynchronously. A telemetry stream 106 is a wireless computer communication utilizing various protocols to send and/or receive electronic signals with time-series data of telemetry data about the operation of the component 104 for a period of time. For example, the telemetry streams 106 may include component statistics, operational metrics, and/or status of the components 104 and/or the vehicle 102. The telemetry streams 106 may additionally or alternatively include environmental data sensed by components 104. The telemetry streams 106 may include timestamps corresponding to telemetry data to define a sequence of the telemetry data in the period of time. Because the components 104 are various, modular, and customizable, the telemetry streams 106 may include various, modular, and customizable types of data.

The rare event detection system 100 includes a sensor interface 108, a processor core 110, a memory 112, a network interface 114, and a display interface 116, which are operably connected for computer communication. The sensor interface 108 provides software and hardware to facilitate data input and output between the components 104 of the vehicle 102 and the rare event detection system 100. For example, the sensor interface 108 receives the telemetry streams 106 from the components 104. The processor core 110 processes signals and performs general computing to execute instructions stored in the memory 112. The instructions cause the processor core 110 to execute operations. The memory 112 may store an operating system that controls or allocates resources of the rare event detection system 100. The memory 112 represents a non-transitory machine-readable memory (or other medium), such as RAM, a solid state drive, a hard disk drive or a combination thereof.

The memory 112 includes a segmentation module 118, an event module 120, a dynamic limit module 122, and a rare event module 124. The memory 112 stores machine-readable instructions associated with the modules 118-124. The processor core 110 accesses the memory 112 and executes the machine-readable instructions as operations. The processor core 110 can be a variety of various processors including multiple single and multicore processors, co-processors, and other multiple single and multicore processor and co-processor architectures.

The network interface 114 provides software and hardware to facilitate data input and output between the rare event detection system 100 and data sources such as a historical database 126, a display 128, etc. via a network 130. The network 130 is, for example, a data network, the Internet, a wide area network (WAN) or a local area (LAN) network. The network 130 serves as a communication medium to various remote devices (e.g., databases, web servers, remote servers, application servers, intermediary servers, client machines, other portable devices).

The display interface 116 provides software and hardware to facilitate data input and output between the rare event detection system 100 and a display 128. The display 128 is a device for outputting information and may be a light-emitting diode (LED) display panels, liquid crystal display (LCD) panel, plasma display panels, and touch screen displays, among others. The display 128 includes graphical input controls for a user interface, which can include software and hardware-based controls, interfaces, touch screens, or touch pads or plug and play devices for an operator, such as the operator 212 of FIG. 2) to provide user input.

The memory 112 includes a rare event detector 129 that includes modules that operate in concert and/or stages to detect rare events of the vehicle 102. A module of the modules 118-124 may be an artificial neural network that acts as a framework for machine learning, including deep learning. For example, a module may be a neural network, a convolution neural network (CNN) or a conditional generative adversarial network (cGAN). A module of the modules 124-130 may include an encoder, decoder, symbol predictor etc. For example, the segmentation module 118 may include an autoencoder, a long short-term memory (LSTM), or other artificial recurrent neural network that determines the representations to classify the telemetry streams 106 in an unsupervised manner. The segmentation module 118 may include convolutional layers and bi-directional LSTM layers that calculate temporal segmentation patterns of historical time-series data for a historical telemetry stream from a first time period. In various examples, the rare event detector 129 can include more less of the modules.

More particularly, the event module 120 categorizes the predicted events by identifying outliers by analyzing a mean, variance, or distribution of historical time series extrapolated using statistical methods, such as Z-score. In another example, the event module 120 categorizes the predicted events of a sequential subsets of the estimated time-series telemetry data, which can be referred to as historical temporal segments (HTSs) using the predicted labels, support vector machines (SVMs), etc. The event module 120 discards the anomalous events to create a nominal subset of predicted events from the set of predicted events.

The dynamic limit module 122 calculates dynamic limits of a temporal segmentation pattern for respective historical temporal segments based on the shapes of the temporal segmentation pattern. The dynamic limits may change for different HTS. The rare event module 124 detects a rare event for an active temporal segment of the set of active temporal segments in response to the incoming telemetry stream 360 exceeding the dynamic limits of an HTS corresponding to the ATS.

Figure 3:
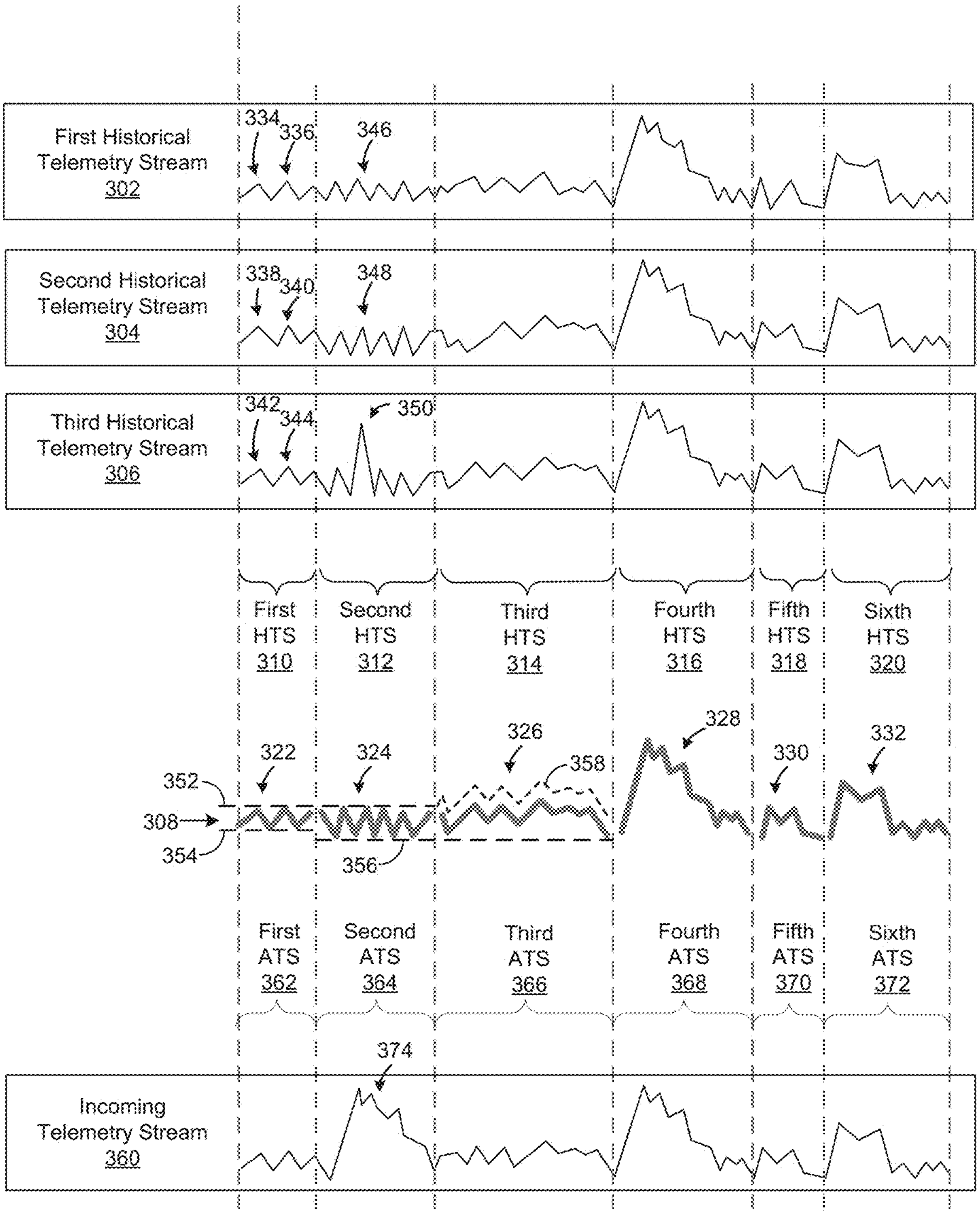
FIG. 3 illustrates an example timing diagram for telemetry streams processed by the rare event detection system.

FIG. 3 illustrates an example of telemetry streams that could be received by a segmentation module, such as the segmentation module 118 of FIG. 1. More particularly, FIG. 3 includes first historical telemetry stream 302, a second historical telemetry stream 304, and a third historical telemetry stream 306. While three historical telemetry streams will be described for clarity, the segmentation module may receive more or fewer historical telemetry streams.

The historical telemetry streams 302-306 include historical time series data, having an amount of telemetry data, associated with a component (e.g., the components 104 of FIG. 1) of the vehicle (e.g., the vehicle 102 of FIG. 1) or another component of another vehicle. The historical telemetry streams 302-306 may be received from a historical database (e.g., the historical database 126 of FIG. 1). The historical telemetry streams 302-306 may be received from the components (e.g., component-1 104, component-2 104, component-K 104) via a sensor interface (e.g., the sensor interface 108 of FIG. 1) or other components from another vehicle with the same vehicle type as the vehicle via the sensor interface 108. Because the components 104 are various, modular, and customizable, the rare event detector 129 is configured to process various, modular, and customizable types of data of the historical telemetry streams 302-306 and provides cross-platform flexibility.

The segmentation module 118 calculates a temporal segmentation pattern 308 based on historical telemetry streams 302-306 that correspond to events that have previously occurred. The temporal segmentation pattern 308 is a set of estimated time-series telemetry data based on the historical telemetry streams 302-306. The temporal segmentation pattern 308 includes historical temporal segments (HTS), for example, a first HTS 310, a second HTS 312, a third HTS 314, a fourth HTS 316, a fifth HTS 318, and a sixth HTS 320. The HTSs 310-320 of the temporal segmentation pattern 308 are sequential subsets of the estimated time-series telemetry data. The HTSs 310-320 are calculated based on parameters including component type, vehicle type, physical environment, mission conditions, mission phase, level of repetition, and vehicle intent, among others.

The segmentation module employs a parameter (or multiple parameters) to define the HTSs 310-320 based on the historical telemetry streams 302-306. For example, the HTSs 310-320 may be identified based on the historical telemetry streams 302-306 being from a similar component, such as the component (e.g., the components 104 of FIG. 1), associated with a similar vehicle system on another vehicle having the same vehicle type (e.g., the vehicle 102 of FIG. 1), or associated with a different vehicle operating in a similar physical environment. As one example, a component (e.g., the component-1 104) may be a latch sensor that indicates that a latch (not shown) of the vehicle is secured or unsecured based on pressure data. The segmentation module may identify HTSs 310-320 based on the historical telemetry streams 302-306 including historical time series data for latch sensors on vehicles having the same vehicle type as the vehicle. Suppose the vehicle type of the vehicle is spacecraft, the historical telemetry streams 302-306 may be received from other spacecraft that have latch sensors.

Different vehicles, such as spacecraft transition through mission phases during their life cycle. Mission phases may include a pre-launch phase, a launch phase, a feature deployment phase (e.g., orbit transitions and associated thruster firings, primary mirror deployment, antenna deployment, sunshield deployment, etc.), and an orbital phase. Because components operate differently during different mission phases, in some examples, the HTSs 310-320 are determined based on the historical telemetry streams 302-306 having corresponding mission phases as the vehicle.

As another example, the HTSs 310-320 of the temporal segmentation pattern 308 may be determined based on mission conditions. The HTSs 310-320 may be identified based on physical environment and/or mission conditions. As one example, a first vehicle (e.g., the vehicle 202 of FIG. 2) experiences different gravity than the planetary conditions of a second vehicle (e.g., the rover 208 on the moon 210 of FIG. 2). If the first vehicle experiences space flight followed by planetary conditions, the HTSs 310-320 of the temporal segmentation pattern 308 may be determined based the historical telemetry streams 302-306 being associated with the respective physical environment (e.g., space flight or planetary conditions).

The set of historical telemetry streams including historical telemetry streams 302-306 may have subsets. For example, a first historical telemetry subset may include the first historical telemetry stream 302 and the second historical telemetry stream 304 from one or more vehicles in an orbital environment. A second historical telemetry subset may include the third historical telemetry stream 306 from a different vehicle in a planetary environment. As another example, the segmentation module may define the level of repetition as a revolution of a vehicle (e.g., the vehicle 202 of FIG. 2) through an orbit (e.g., the orbit 206). The level of repetition may be defined as a time period (e.g., Julian day of the year) for the revolution of orbiting satellite bodies (e.g., the vehicle 202, the celestial body 204, the moon 210 of FIG. 2, etc.) around another body (e.g., the celestial body 204 of FIG. 2, the earth, sun, etc.). The HTSs 310-320 of the temporal segmentation pattern 308 are determine the HTSs 310-320 for the vehicle from the revolutions or time period based on the level of repetition.

In another example, a first component (e.g., component-1 104 of FIG. 1) may be a latch sensor of a vehicle (e.g., the vehicle 102) and a second component (e.g., the component-2 104 of FIG. 1) may be a gravitational sensor of the vehicle. The segmentation module may use time series data from a telemetry stream that captured telemetry data for a time period in the past. For example, the telemetry stream may be a first historical telemetry (e.g., the first historical telemetry stream 302) corresponding to a second component (e.g., the component-2 104 of FIG. 1) and include gravitational telemetry data. The segmentation module may identify the HTSs 310-320 based on mission conditions, such as gravitational force, from the first historical telemetry stream 302. The segmentation module may then temporally align the HTSs 310-320 with other historical telemetry streams, for example, the second historical telemetry stream 304 corresponding to the first component. The temporal segmentation pattern 308 is then generated based on the temporally aligned historical telemetry streams, here the first historical telemetry stream 302 and the second historical telemetry stream 304. Accordingly, the HTSs 310-320 of the temporal segmentation pattern 308 may be based on a historical telemetry subset of the set of historical telemetry streams. The historical telemetry subset may include each of the historical telemetry streams 302-306 in the set of historical telemetry streams or be a proper subset.

The segmentation module may determine the HTSs 310-320 based on vehicle intent. Vehicle intent is based on a desired action of a component (e.g., the component 104 of FIG. 1) and/or the vehicle (e.g., the vehicle 102 of FIG. 1). For example, in a feature deployment phase, the vehicle may be configured to release the latch corresponding to the latch sensor of the first component (e.g., component-1 104). The HTSs 310-320 are defined based on the historical telemetry streams 302-306 for the vehicle or vehicles having the same vehicle type and/or component type that have the same vehicle intent, here, to release a latch. Accordingly, in this example, the historical telemetry streams 302-306 include historical time series data from latch sensors during a period in which a latch was to be released.

In some examples, the segmentation module smooths historical and/or estimated time-series data in a smoothing operation. In one example, the smoothing operation is performed on the historical telemetry streams 302-306 to remove short-term irregularities from the historical time-series data of the historical telemetry streams 302-306. Removing short-term irregularities included in the historical telemetry streams 302-306 avoids incorporating the short-term irregularities in the temporal segmentation pattern 308. Accordingly, a shape of a respective historical temporal segment may be determined based on the smoothed historical time-series data.

In another example, the smoothing operation is performed on the temporal segmentation pattern 308 to minimize the confluence of irregularities that may have been propagated in the temporal segmentation pattern 308 from the historical telemetry streams 302-306. In either example, the result is a smoothed temporal segmentation pattern. The smoothing operation may include a moving average technique.

An event module (e.g., the event module 120 of FIG. 1) identifies sets of predicted events associated with the HTSs 310-320 based on the historical telemetry streams 302-306. For example, a first set of predicted events is associated with the first HTS 310 and a second set of predicted events is associated with the second HTS 312. In some examples, the event module encodes and decodes the historical telemetry streams 302-306 by the HTSs to generate a mapping that identifies predicted labels corresponding to predicted events. The predicted labels may correspond to vehicle actions of the vehicle, such as securing a latch or releasing the latch. In some examples, the predicted labels may be learned or received from a historical database (e.g., the historical database 126 of FIG. 1).

The predicted events of the historical telemetry streams 302-306 correspond to shapes of the temporal segmentation pattern 308, such as a first shape 322, a second shape 324, a third shape 326, a fourth shape 328, a fifth shape 330, and a sixth shape 332. The shapes 322-332 are based on features of the predicted events of the temporal segmentation pattern 308 in a given HTS of the HTSs 310-320. For example, the first shape 322 of the first HTS 310 is based on the estimated time-series data calculated from the time-series data of the first historical telemetry stream 302, the second historical telemetry stream 304, and the third historical telemetry stream 306 in the first HTS 310.

As one example, the first historical telemetry stream 302 of the first HTS 310 includes a first event 334 and a second event 336. The second historical telemetry stream 304 of the first HTS 310 includes a third event 338 and a fourth event 340. The third historical telemetry stream 306 of the first HTS 310 includes a fifth event 342 and a sixth event 344. Accordingly, a set of predicted events of the first HTS 310 includes the events 334-344. The first shape 322 corresponds to the repetition of features of the predicted events in the historical telemetry streams 302-306. For example, the first event 334 and the second event 336 of the first historical telemetry stream 302 include two maxima. Therefore, the first HTS 310 of the first historical telemetry stream 302 has a feature of the two maxima. The first HTS 310 of the second historical telemetry stream 304 has the same feature of two maxima, defined by the third event 338 and a fourth event 340. The first HTS 310 of the third historical telemetry stream 306 also has this feature of two maxima, defined by the fifth event 342 and a sixth event 344. Therefore, the first shape 322 includes this feature of two maxima corresponding to the maxima of the predicted events 334-344.

In some examples, predicted events may be discarded to avoid anomalous events from affecting the temporal segmentation pattern 308. As one example, the second HTS 312 includes a seventh event 346 of the first historical telemetry stream 302, an eighth event 348 of the second historical telemetry stream 304, and a ninth event 350 of the third historical telemetry stream 306. The events 346-350 of a set of predicted events of the second HTS 312 are categorized as nominal events or anomalous events based on the features of the predicted events 346-350. For example, the seventh event 346 and the eighth event 348 have a tooth shape feature with maxima having generally the same height defined by the time-series data of the first historical telemetry stream 302 and the second historical telemetry stream 304, respectively. However, the ninth event 350 does not have the tooth shape feature. Instead, the ninth event 350 has a single maxima feature with a height that extends beyond other maxima in the second HTS 312 of the third historical telemetry stream 306.

An event module (e.g., the event module 120 of FIG. 1) categorizes the seventh event 346 and the eighth event 348 as nominal events and the ninth event 350 as anomalous because the ninth event 350 does not generally conform to the features of the other time-series data of the second HTS 312. In one example, the event module categorizes the predicted events by identifying outliers by analyzing the time series' mean, variance, or distribution using statistical methods, such as Z-score. In another example, the event module categorizes the predicted events of a given HTS using the predicted labels, support vector machines (SVMs), etc.

The event module discards the anomalous events to create a nominal subset of predicted events from the set of predicted events. Continuing the example from above, the seventh event 346 and the eighth event 348 form the subset of predicted events. The second shape 324 of the second HTS 312 is calculated based on the nominal subset of predicted events. Accordingly, the second shape 324 of the second HTS 312 has a tooth shape with maxima having generally the same height like the features of the seventh event 346 and the eighth event 348 and does not incorporate the single maxima feature of the ninth event 350. In this manner, the event module discards anomalous events so that anomalous events do not affect the temporal segmentation pattern 308. The nominal subset of predicted events may include each of the predicted events of set of predicted events for a given HTS or be a proper subset.

A dynamic limit module (e.g., the dynamic limit module 122 of FIG. 1) calculates dynamic limits of the temporal segmentation pattern 308 for respective historical temporal segments based on the shapes of the temporal segmentation pattern. The dynamic limits may change for different HTSs. For example, the dynamic limits of the first HTS 310 include a first upper bound 352 that corresponds to the maxima of the first shape 322 of the first HTS 310 and a first lower bound 354 that corresponds to the minima of the first shape 322. The dynamic limits change over time. For example, in the second HTS 312, the first upper bound 352 may satisfy the second shape 324 but the lower limit may be adjusted from the first lower bound 354 to a second lower bound 356. The dynamic limits may also change in time within the HTSs as projected bounds that correspond to the shape of the HTSs. For example, a second upper bound 358 of the third HTS 314 is a projection bound that tracks the third shape 326 of the third HTS 314. The dynamic limit module may calculate the dynamic limits using a best estimate statical forecast, trend analysis, and/or predictive modeling, among others.

When an incoming telemetry stream 360 is received, a rare event module (e.g., rare event module 124 of FIG. 1) identifies a set of active temporal segments (ATSs) that correspond to a subset of the HTSs of the temporal segmentation pattern 308. The ATSs represent a second time period after the first time period of the HTSs. For example, the first HTS 310 corresponds to a first ATS 362, the second HTS 312 corresponds to a second ATS 364, the third HTS 314 corresponds to a third ATS 366, the fourth HTS 316 corresponds to a fourth ATS 368, the fifth HTS 318 corresponds to a fifth ATS 370, and the sixth HTS 320 corresponds to a sixth ATS 372.

In one example, the first time period is from a previous repetition of the vehicle (e.g., a previous orbit) and the second time period is current (e.g., the present orbit). The rare event module may determine the correspondence between the HSTs and ASTs based on parameters including component type, vehicle type, physical environment, mission conditions, mission phase, level of repetition, and vehicle intent, among others in a similar manner as the segmentation module (e.g., the segmentation module 118 of FIG. 1) calculates correspondence between the historical telemetry streams 302-306.

The rare event module detects a rare event for an active temporal segment of the set of active temporal segments in response to the incoming telemetry stream 360 exceeding the dynamic limits of an HTS corresponding to the ATS. For example, the first upper bound 352 and the first lower bound 354 of the first HTS 310 are applied to the incoming telemetry stream 360 in the first ATS 362. The incoming telemetry stream 360 satisfies the first upper bound 352 and the first lower bound 354, accordingly, the incoming telemetry stream 360 is in a nominal operational state in the first ATS 362. Continuing the example, the rare event module 124 applies the first upper bound 352 and the second lower bound 356 to the second ATS 364. The incoming telemetry stream 360 exceeds the first upper bound 352, accordingly, the rare event module detects a first rare event 374 in the second ATS 364.

The first rare event 374 may indicate that the vehicle 102 is in an anomalous operational state in the second HTS 312 and that an error may be imminent. The dynamic limits are tailored to the incoming telemetry stream 360 to indicate rare events that may be attributable to anomalous behavior of the vehicle. Continuing the example from above, the first rare event 374 may correspond to increased pressure readings in the incoming telemetry stream 360 that indicate a latch has not released. While the increasing pressure readings of the telemetry data in the incoming telemetry stream may not rise to the level of an error in itself but be anomalous behavior where the current intent of the vehicle for this HTS is not in alignment with the observed telemetry indicating an error is possible. The dynamic limits provide an earlier awareness of potential errors such that the rare event module has sufficient time to generate and/or request a remedial response for the first rare event 374.

Figure 4:
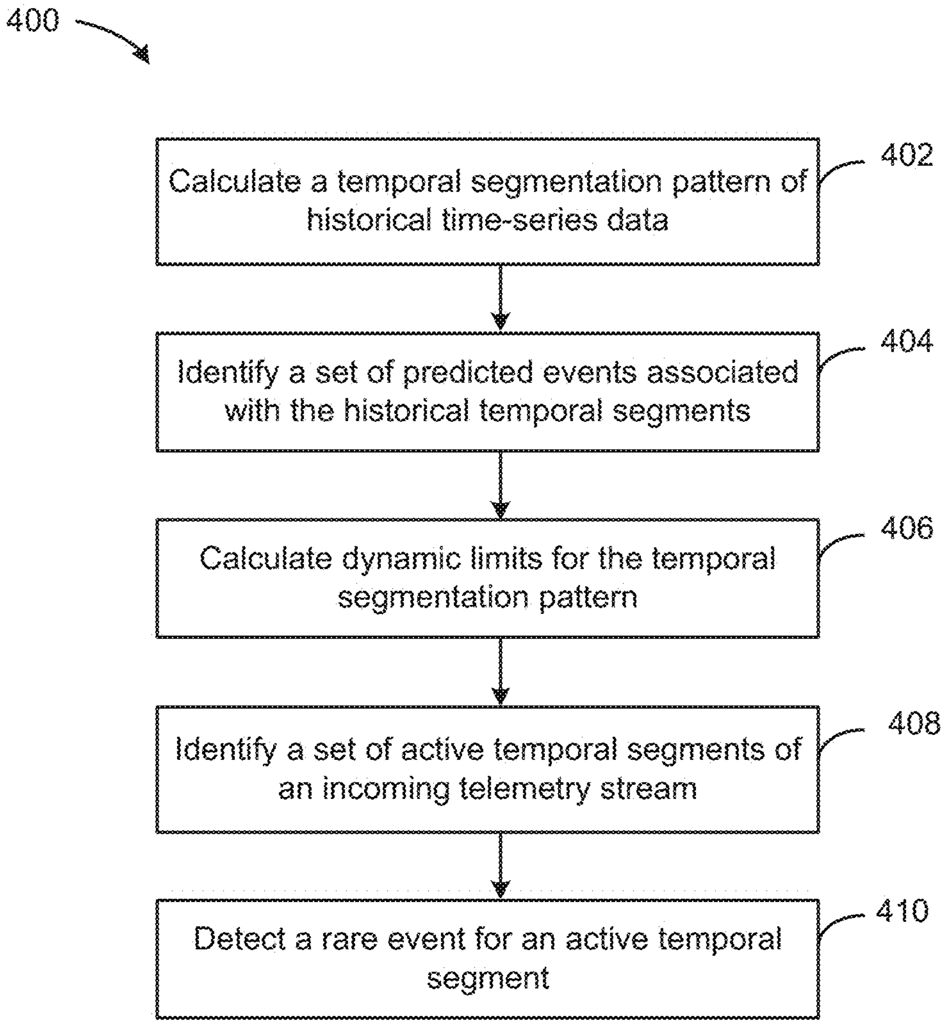
FIG. 4 illustrates a flowchart of an example method for detecting rare events.

FIG. 4 illustrates a flowchart for an example method 400 for using a rare event detection system (e.g., the rare event detection system 100 of FIG. 1) in a physical environment (e.g., the extraterrestrial environment 200 of FIG. 2). The method 400 can be implemented with a vehicle (e.g., the vehicle 102 of FIG. 1 and/or the vehicle 202 of FIG. 2).

At block 402, the method 400 includes calculating a temporal segmentation pattern (e.g., the temporal segmentation pattern 308) based on historical time-series data of a historical telemetry stream (e.g., the first historical telemetry stream 302, the second historical telemetry stream 304, the third historical telemetry stream 306 of FIG. 3) from a first time period. The temporal segmentation pattern includes historical temporal segments (HTSs) (e.g., the first HTS 310, the second HTS 312, the third HTS 314, the fourth HTS 316, the fifth HTS 318, and the sixth HTS 320 of FIG. 3).

At block 404, the method 400 includes identifying a set of predicted events associated with the HTSs based on based on the historical telemetry streams. For example, a first set of predicted events of an initial HTS (e.g., the first HTS 310) includes predicted events (e.g., the first event 334, the second event 336, the third event 338, the fourth event 340, the fifth event 342, and the sixth event 344 of FIG. 3). The second set of predicted events includes predicted events from a next HTS (e.g., the second HTS 312) including different predicted events (e.g., the seventh event 346, the eighth event 348, and the ninth event 350 of FIG. 3).

Sets of predicted events correspond to shapes of the temporal segmentation pattern. For example, the first set of predicted events of the initial HTS (e.g., the first HTS 310 of FIG. 3) corresponds to an initial shape (e.g., the first shape 322 of FIG. 3) of the temporal segmentation pattern. The second set of predicted events of the next HTS (e.g., the second HTS 312 of FIG. 3) corresponds to a next shape (e.g., the second shape 324 of FIG. 3) of the temporal segmentation pattern.

At block 406, the method 400 includes calculating dynamic limits for the temporal segmentation pattern based on the shapes of respective HTSs of the temporal segmentation pattern. The dynamic limits may include an upper bound (e.g., the first upper bound 352 of FIG. 3), a lower bound (e.g., the first lower bound 354 and the second lower bound 356 of FIG. 3), and a projected bound (e.g., the second upper bound 358 of FIG. 3). In one example, the dynamic limits are calculated using a best estimate statical forecast.

At block 408, the method 400 includes identifying a set of active temporal segments (ATSs) (e.g., the first ATS 362, the second ATS 364, the third ATS 366, the fourth ATS 368, the fifth ATS 370, and the sixth ATS of FIG. 3) of an incoming telemetry stream (e.g., the incoming telemetry stream 360 of FIG. 3) that correspond to a subset of the historical temporal segments of the temporal segmentation pattern (e.g., the first HTS corresponds to the first ATS 362, the second HTS 312 corresponds to the second ATS 364, the third HTS 314 corresponds to the third ATS 366, the fourth HTS 316 corresponds to the fourth ATS 368, the fifth HTS 318 corresponds to the fifth ATS 370, and the sixth HTS 320 corresponds to the sixth ATS 372 of FIG. 3).

The active temporal segments are from a second time period after the first time period. For example, the historical temporal segments may include telemetry data from events that previously occurred in a first time period, while the second time period is elapsing in real-time such that the incoming telemetry stream captures the current status of a vehicle and/or a physical environment.

At block 410, the method 400 includes detecting a rare event (e.g., the first rare event 374 of FIG. 3) for an active temporal segment of the set of active temporal segments in response to the incoming telemetry stream exceeding the dynamic limits for a historical temporal segment corresponding to the active temporal segment. Because the dynamic limits are tailored to the incoming telemetry stream and change based on the estimated telemetry data, the rare event detection system detects rare events sooner, giving an operator (e.g., the operator 212 of FIG. 2) additional time to address conditions indicated by the rare events as anomalous.

Figure 5:
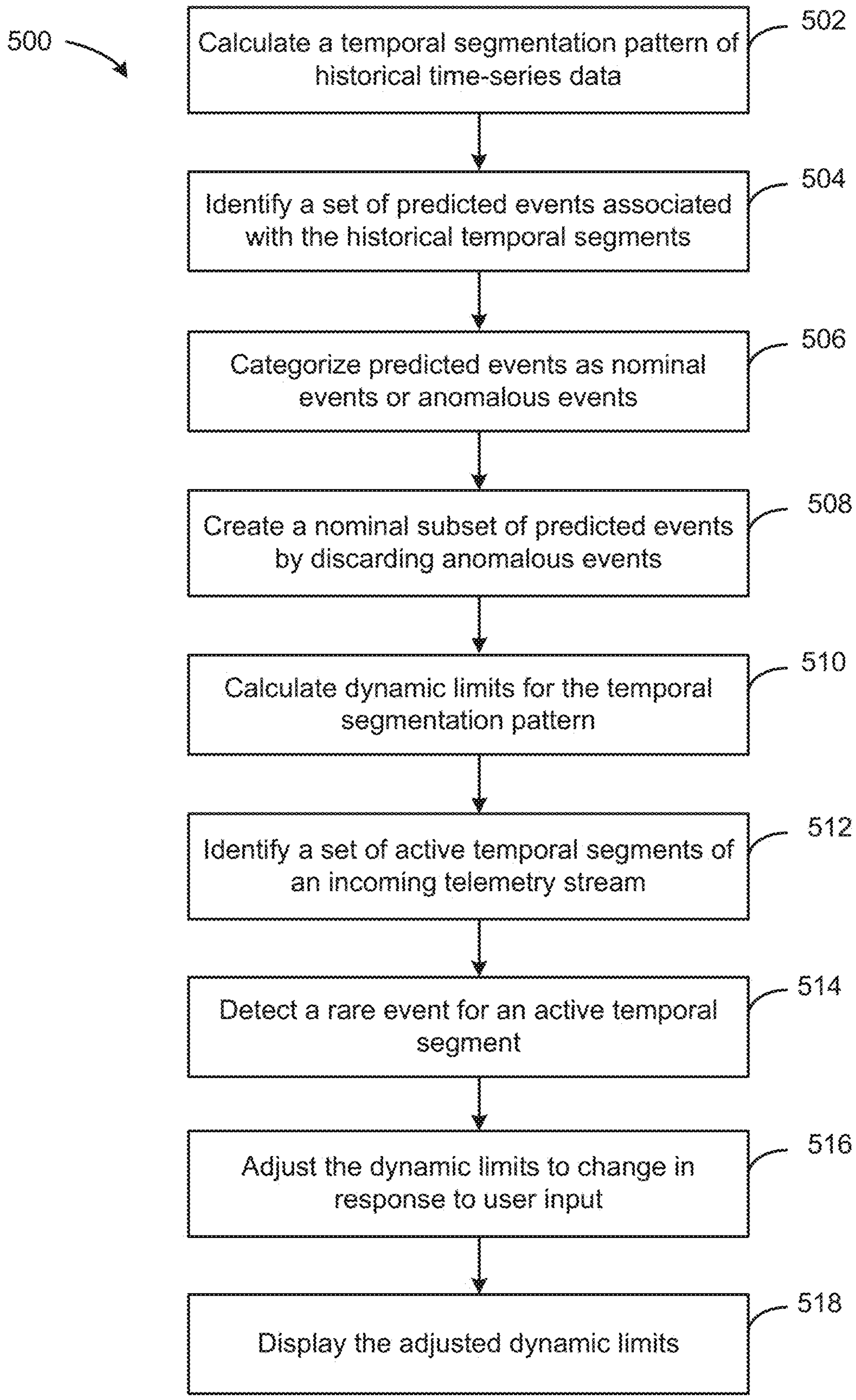
FIG. 5 illustrates a flowchart of another example method for detecting rare events.

FIG. 5 illustrates a flowchart for an example method 500 for using the rare event detection system in an operating environment (e.g., the extraterrestrial environment 200 of FIG. 2). The method 500 can be implemented with a vehicle, such as the vehicle 102 and of FIG. 1 and/or the rare event detection system 100 of FIG. 1.

At block 502, the method 500 includes calculating a temporal segmentation pattern of historical time-series data for a historical telemetry stream from a first time period. The temporal segmentation pattern includes historical temporal segments (HTSs).

At block 504, the method 500 includes identifying sets of predicted events associated with the historical temporal segments based on the historical telemetry streams. Sets of predicted events correspond to shapes of the temporal segmentation pattern.

At block 506, the method 500 includes categorizing predicted events of the set of predicted events as nominal events or anomalous events based on features of the predicted events. For example, the set of predicted events may include a total number of events (e.g., the seventh event 346, the eighth event 348, and the ninth event 350 of FIG. 3) in an HTS (e.g., the second HTS 312 of FIG. 3). Predicted events may be categorized as nominal events (e.g., the seventh event 346, the eighth event 348) and anomalous events (e.g., the ninth event 350) based on statical methods (e.g., percentile and interquartile range (IQR) methods) or machine learning techniques (e.g., Bayesian networks, Hidden Markov models, cluster analysis, replicator neural networks, SVMs, etc.).

At block 508, the method 500 includes discarding the anomalous events (e.g., the ninth event 350) to create a nominal subset of predicted events from the set of predicted events. If none of the predicted events of the total number of predicted events is categorized as an anomalous event, then the subset of nominal events includes the total number of predicted events. Alternatively, if one predicted event of the total number of predicted events is categorized as an anomalous event, then the subset of nominal events is a proper subset and includes fewer than the total number of predicted events. The temporal segmentation pattern is calculated based on the predicted events of the nominal subset of predicted events. By discarding the anomalous events, the telemetry data associated with anomalous behavior, which is tantamount to noise, is not used to estimate the estimated telemetry data of the temporal segmentation pattern. Accordingly, the temporal segmentation pattern reflects the expected status of the vehicle as a function of time.

Figure 6:
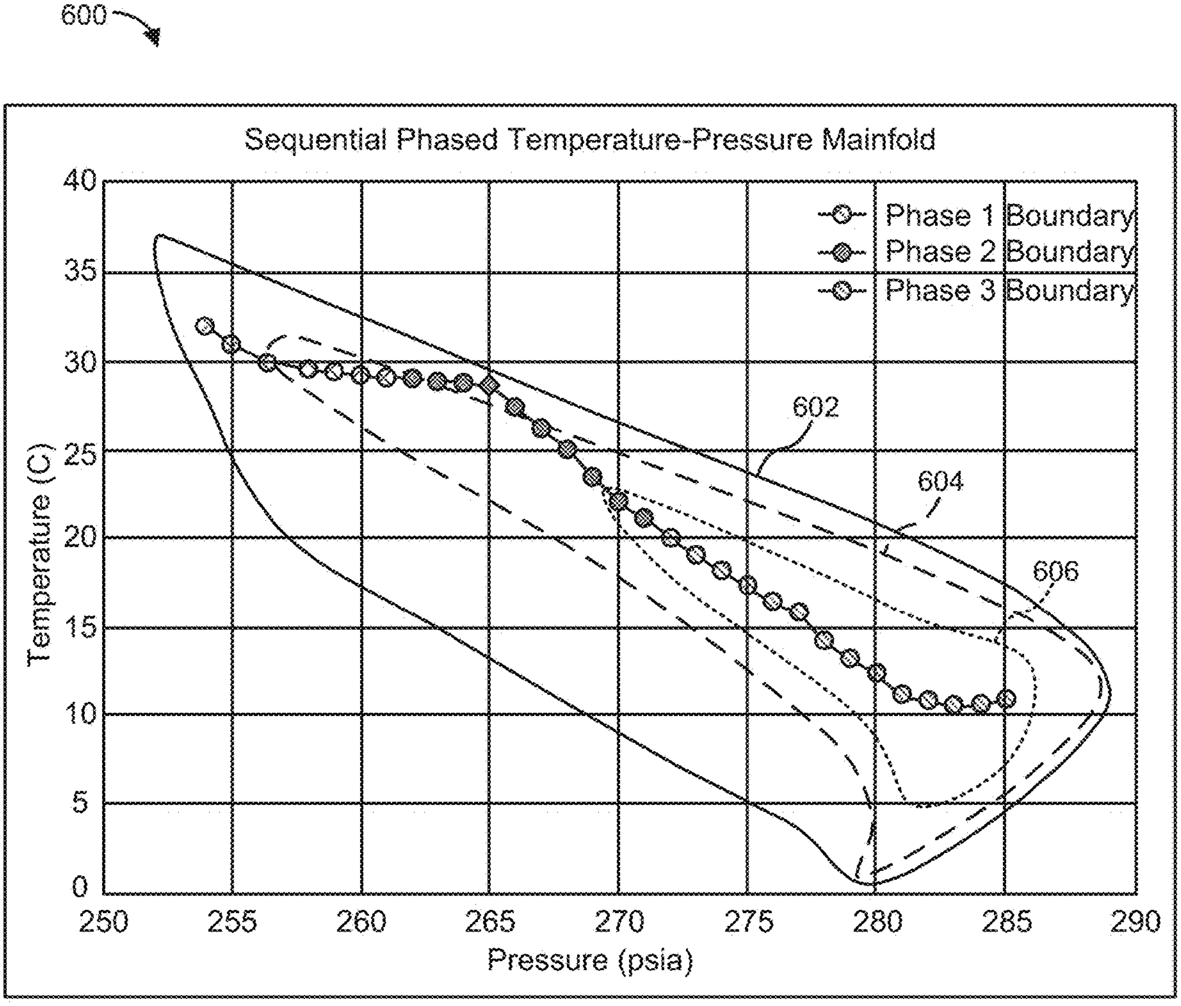
FIG. 6 illustrates example dynamic limits and a covariant dynamic limit of the rare event detection system.

At block 510, the method 500 includes calculating dynamic limits for the respective HTSs based on the shapes of the temporal segmentation pattern. Turning to FIG. 6, the dynamic limits include a first dynamic limit 602 for a first HTS, a second dynamic limit 604 for a second HTS, and a third dynamic limit 606 that is based on a covariance of the first dynamic limit and a second dynamic limit. Using a covariance of dynamic limits allows the dynamic limit module to account for the relationship between dynamic limits. For example, while an incoming telemetry stream may not exceed the first dynamic limit 602 and the second dynamic limit 604 in an ATS, the incoming telemetry stream is hovering near upper bounds of the first dynamic limit 602 and the second dynamic limit 604 may indicate a rare event. The third dynamic limit 606 is calculated to identify the rare event even if other dynamic limits (e.g., the first dynamic limit 602 and the second dynamic limit 604) by capturing the covariance between the dynamic limits 602, 604. While two dynamic limits are described, the dynamic limit module may calculate a covariance of three or more dynamic limits.

As one example, the dynamic limit module may calculate a covariance matrix that characterizes the third dynamic limit 606 between the first dynamic limit 602 and the second limit 604. The third dynamic limit 606 is the weighted distance between the first dynamic limit 602 and the second limit 604. In other example, other statistical methods may be used to define the third dynamic limit 606. While the dynamic limits 602, 604 are described as being calculated with reference to HTS, the dynamic limits 602, 604 may be calculated based on different telemetry streams. For example, the first dynamic limit 602 may be calculated based on a first telemetry stream, and the second dynamic limit 604 may be calculated based on a second telemetry stream. In this manner, the dynamic limits 602-606 may be incorporated with the temporal segmentation pattern based on the historical telemetry streams used to estimate the estimated telemetry data.

Returning to FIG. 5, at block 512, the method 500 includes identifying a set of active temporal segments of an incoming telemetry stream that correspond to a subset of the historical temporal segments of the temporal segmentation pattern. The active temporal segments are from a second time period after the first time period.

At block 514, the method 500 includes detecting a rare event for an active temporal segment of the set of active temporal segments in response to the incoming telemetry stream exceeding the dynamic limits for a historical temporal segment corresponding to the active temporal segment. Continuing the example from above, the rare event may be detected in response to the incoming telemetry stream being within the first dynamic limit and the second dynamic limit associated with the active temporal segment and exceeding the third dynamic limit.

Figure 7:
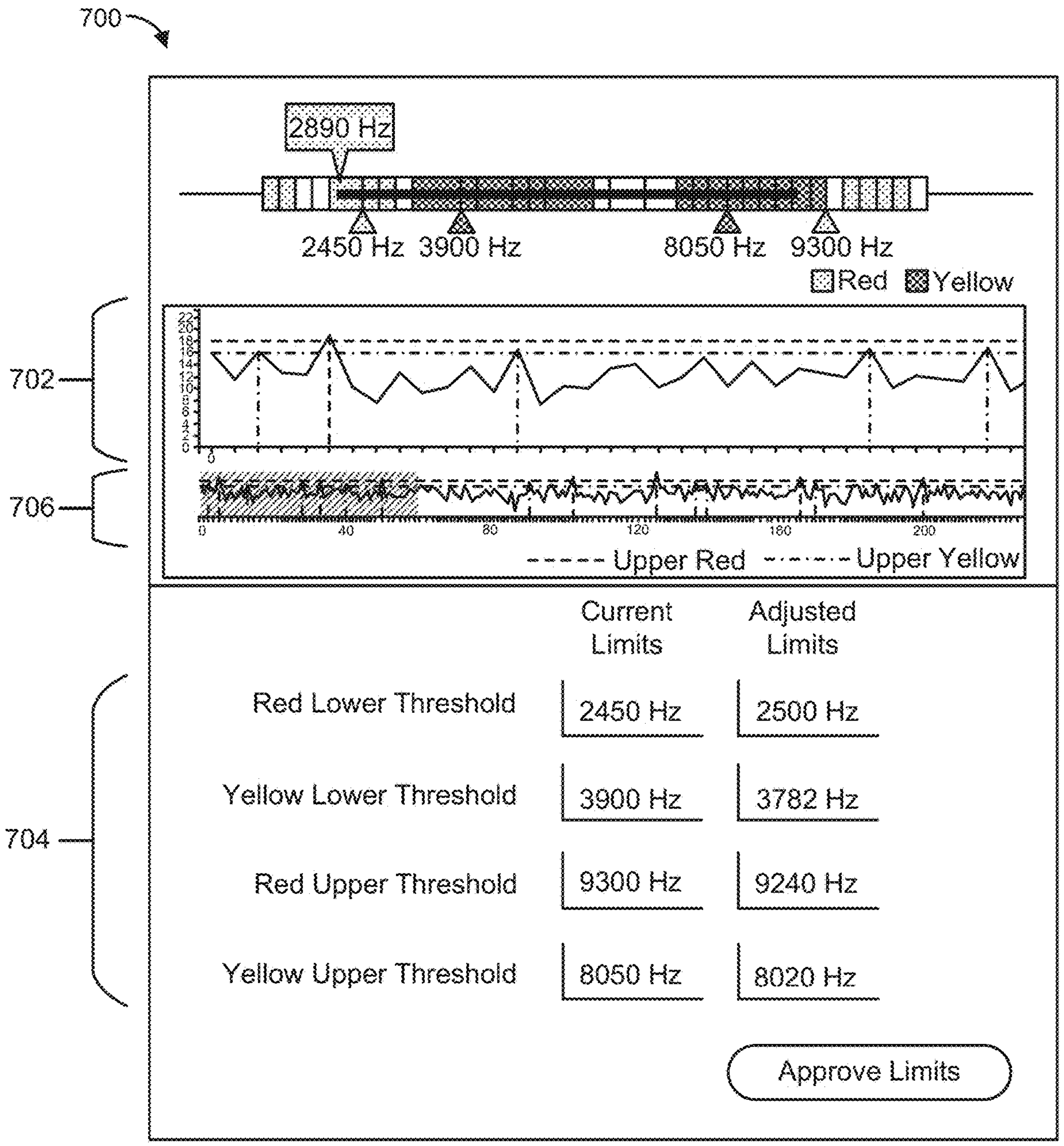
FIG. 7 illustrates an example management dashboard for using a rare event detection system.

At block 516, the method 500 includes displaying a management dashboard, for example, the management dashboard 700, shown in FIG. 7. In one example, a display (e.g., the display 128 of FIG. 1) is configured to display the management dashboard 700. The management dashboard 700 includes the incoming telemetry stream 702 and adjustable dynamic limits 704, a temporal segmentation pattern 706.

Returning to FIG. 5, at block 518, the method 500 includes adjusting the dynamic limits (e.g., the dynamic limits 704 of FIG. 7) on the management dashboard in response to user input to adjust the dynamic limits associated with an active temporal segment. The dynamic limits are adjustable and may be changed in real-time. For example, the dynamic limits may be changed as the incoming telemetry stream is received. Adjustments may be received by a display interface (e.g., the display interface 116 of FIG. 1). The display interface include provisions for receiving input and/or communicating information as output to the display. In some embodiments, the display interface and/or the display can include one or more input buttons, switches, touch screen, touch pad, pointer, lights, microphones, speakers, and LEDs, among others. For example, the dynamic limits of the management dashboard may be controlled by the display interface as an input and/or output device. In some embodiments, the adjustments to the dynamic limits are initiated via data input and/or a touch input to the display. Turning to FIG. 7, the management dashboard 700 may have different components and configurations than those shown in FIG. 7. Therefore, the rare event detection system provides the operator (e.g., the operator 212 of FIG. 2) with flexibility to adjust dynamic limits based on current conditions. For example, in an inhospitable environment where the vehicle is inaccessible, the vehicle may encounter unexpected conditions that should be accounted for in the dynamic limits 704. Adjustable dynamic limits 704 allow the operator to adapt to unexpected conditions, rare events, etc. Accordingly, the rare event detection system offers additional time and flexibility to address conditions indicated by anomalies by detecting rare events sooner, thereby extending mission availability significantly which reduces total lifecycle cost.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

In this description, unless otherwise stated, "about," "approximately" or "substantially" preceding a parameter means being within +/−10 percent of that parameter. Modifications are possible in the described embodiments, and other embodiments are possible, within the scope of the claims.

What is claimed is:

1. A non-transitory machine-readable medium having machine executable instructions for a rare event detector for a vehicle causing a processor core to execute operations, the operations comprising:

calculating a temporal segmentation pattern based on historical time-series data of historical telemetry streams from a first time period, wherein the historical telemetry streams include at least one or more of historical component statistics, historical operational metrics, or a historical status of a component of the vehicle, and wherein the temporal segmentation pattern includes historical temporal segments;

identifying sets of predicted events associated with the historical temporal segments based on the historical telemetry streams, wherein the sets of predicted events correspond to shapes of the temporal segmentation pattern for respective historical temporal segments;

calculating dynamic limits for the respective historical temporal segments based on the shapes of the temporal segmentation pattern defining bounds of nominal behavior of the component;

displaying the temporal segmentation pattern and dynamic limits on a display;

identifying a set of active temporal segments of an incoming telemetry stream that captures at least one or more of current component statistics, current operational metrics, or a current status of the component of the vehicle, the set of active temporal segments correspond to a subset of the historical temporal segments of the temporal segmentation pattern, wherein the active temporal segments are from a second time period after the first time period;

detecting a rare event for an active temporal segment of the set of active temporal segments in response to the incoming telemetry stream exceeding the dynamic limits for a historical temporal segment corresponding to the active temporal segment corresponding to anomalous behavior of the component; and displaying the active temporal segment having the rare event for the component.

2. The non-transitory machine-readable medium of claim 1, wherein the operations further comprise:

categorizing predicted events of a set of predicted events as nominal events or anomalous events based on features of the predicted events; and discarding the anomalous events to create a nominal subset of predicted events from the set of predicted events, wherein the temporal segmentation pattern is calculated based on the nominal subset of predicted events.

3. The non-transitory machine-readable medium of claim 1, wherein the temporal segmentation pattern is calculated based on parameters including one or more of vehicle type, vehicle intent, physical environment, and level of repetition.

4. The non-transitory machine-readable medium of claim 1, wherein the dynamic limits include an upper bound, a lower bound, or a projected bound using a best estimate statical forecast.

5. The non-transitory machine-readable medium of claim 1, wherein the operations further comprise smoothing the historical time-series data in a smoothing operation to generate a smoothed temporal segmentation pattern, a shape of a respective historical temporal segment being determined based on the smoothed historical time-series data.

6. The non-transitory machine-readable medium of claim 1, wherein the operations further comprise generating a remedial response for the rare event.

7. The non-transitory machine-readable medium of claim 1, wherein the operations further comprise:

displaying a management dashboard including the incoming telemetry stream and the dynamic limits for a historical temporal segment corresponding to an active temporal segment, the dynamic limits being adjustable; and adjusting the dynamic limits on the management dashboard in response to user input to adjust the dynamic limits associated with the active temporal segment.

8. The non-transitory machine-readable medium of claim 1, wherein the dynamic limits include a first dynamic limit for a first historical temporal segment of the historical temporal segments, a second dynamic limit for second historical temporal segment of the historical temporal segments, and a third dynamic limit that is based on a covariance of the first dynamic limit and a second dynamic limit; and wherein the rare event is detected in response to the incoming telemetry stream being within the first dynamic limit and the second dynamic limit associated with an active temporal segment and exceeding the third dynamic limit.

9. A rare event detection system comprising:

a memory for storing machine-readable instructions; and a processor core for accessing the machine-readable instructions and executing the machine-readable instructions as operations, the operations comprising:

calculating a temporal segmentation pattern based on historical time-series data of historical telemetry streams from a first time period, wherein the historical telemetry streams include at least one or more of historical component statistics, historical operational metrics, or a historical status of a component of a vehicle, and wherein the temporal segmentation pattern includes historical temporal segments;

identifying sets of predicted events associated with the historical temporal segments based on the historical telemetry streams, wherein the sets of predicted events correspond to shapes of the temporal segmentation pattern for respective historical temporal segments;

calculating dynamic limits for the respective historical temporal segments based on the shapes of the temporal segmentation pattern defining bounds of nominal behavior of the component;

identifying a set of active temporal segments of an incoming telemetry stream that captures at least one or more of current component statistics, current operational metrics, or a current status of the component of the vehicle, the set of active temporal segments correspond to a subset of the historical temporal segments of the temporal segmentation pattern, wherein the active temporal segments are from a second time period after the first time period;

detecting a rare event for an active temporal segment of the set of active temporal segments in response to the incoming telemetry stream exceeding the dynamic limits for a historical temporal segment corresponding to the active temporal segment corresponding to anomalous behavior of the component; and displaying the active temporal segment having the rare event for the component.

10. The rare event detection system of claim 9, wherein the dynamic limits include a first dynamic limit for a first historical temporal segment of the historical temporal segments, a second dynamic limit for second historical temporal segment of the historical temporal segments, and a third dynamic limit that is based on a covariance of the first dynamic limit and a second dynamic limit, wherein the rare event is detected in response to the incoming telemetry stream being within the first dynamic limit and the second dynamic limit associated with an active temporal segment and exceeding the third dynamic limit.

11. The rare event detection system of claim 9, wherein the historical telemetry streams and the incoming telemetry stream are received from a vehicle deployed in an environment.

12. The rare event detection system of claim 9, wherein the operations further comprise:

categorizing predicted events of a set of predicted events as nominal events or anomalous events based on features of the predicted events; and discarding the anomalous events to create a nominal subset of predicted events from the set of predicted events, wherein the temporal segmentation pattern is calculated based on the nominal subset of predicted events.

13. The rare event detection system of claim 9, wherein the temporal segmentation pattern is calculated based on parameters including one or more of vehicle type, vehicle intent, physical environment, and level of repetition.

14. The rare event detection system of claim 9, wherein the dynamic limits include an upper bound, a lower bound, or a projected bound using a best estimate statical forecast.

15. The rare event detection system of claim 9, wherein the operations further comprise smoothing the historical time-series data in a smoothing operation to generate a smoothed temporal segmentation pattern, and wherein a shape of a respective historical temporal segment of the historical temporal segments is determined based on the smoothed historical time-series data.

16. The rare event detection system of claim 9, wherein:

a display configured to display a management dashboard including the incoming telemetry stream and the dynamic limits for a historical temporal segment corresponding to an active temporal segment, the dynamic limits being adjustable, wherein the operations comprise:

adjusting the dynamic limits on the management dashboard of the display in response to user input to adjust the dynamic limits associated with the active temporal segment.

17. A method for detecting rare events, the method comprising:

calculating, by a segmentation module operating on a computing platform, a temporal segmentation pattern based on historical time-series data of historical telemetry streams from a first time period, wherein the historical telemetry streams include at least one or more of historical component statistics, historical operational metrics, or a historical status of a component of a vehicle, and wherein the temporal segmentation pattern includes historical temporal segments;

calculating, by an event module operating on the computing platform, a temporal segmentation pattern of historical time-series data for historical telemetry streams from a first time period, wherein the temporal segmentation pattern includes historical temporal segments;

identifying, by the event module, sets of predicted events associated with the historical temporal segments based on the historical telemetry streams, wherein the sets of predicted events correspond to shapes of the temporal segmentation pattern for respective historical temporal segments;

calculating, by a dynamic limit module operating on the computing platform, dynamic limits for the respective historical temporal segments based on the shapes of the temporal segmentation pattern defining bounds of nominal behavior of the component;

identifying, by the dynamic limit module, a set of active temporal segments of an incoming telemetry stream that captures at least one or more of current component statistics, current operational metrics, or a current status of the component of the vehicle, the set of active temporal segments correspond to a subset of the historical temporal segments of the temporal segmentation pattern, wherein the active temporal segments are from a second time period after the first time period;

detecting, by a rare event module, a rare event for an active temporal segment of the set of active temporal segments in response to the incoming telemetry stream exceeding the dynamic limits for a historical temporal segment corresponding to the active temporal segment corresponding to anomalous behavior of the component; and displaying the active temporal segment having the rare event for the component.

18. The method of claim 17, wherein the method further comprises:

categorizing, by the event module, predicted events of a set of predicted events as nominal events or anomalous events based on features of the predicted events; and discarding, by the event module, the anomalous events to create a nominal subset of predicted events from the set of predicted events, wherein the temporal segmentation pattern is calculated based on the nominal subset of predicted events.

19. The method of claim 17, wherein the dynamic limits include a first dynamic limit for a first historical temporal segment of the historical temporal segments, a second dynamic limit for second historical temporal segment of the historical temporal segments, and a third dynamic limit that is based on a covariance of the first dynamic limit and a second dynamic limit.

20. The method of claim 19, wherein the rare event is detected in response to the incoming telemetry stream being within the first dynamic limit and the second dynamic limit associated with an active temporal segment and exceeding the third dynamic limit.

* * * * *